United States Patent [19]

Geiersbach et al.

[11] 4,428,150
[45] Jan. 31, 1984

[54] ELECTRODE ARRANGEMENT FOR ELECTRIC WEED KILLING APPARATUS

[75] Inventors: Allois F. Geiersbach, Milwaukee; Thomas P. Gilmore, Wauwatosa, both of Wis.

[73] Assignee: Allis-Chalmers Corporation, Milwaukee, Wis.

[21] Appl. No.: 508,995

[22] Filed: Jun. 29, 1983

Related U.S. Application Data

[63] Continuation of Ser. No. 315,137, Oct. 26, 1981, abandoned.

[51] Int. Cl.$^3$ ............................................. A01M 21/00
[52] U.S. Cl. ............................................ 47/1.3; 363/64
[58] Field of Search .................. 363/64; 336/181, 182, 336/150, 183; 43/98

[56] References Cited

U.S. PATENT DOCUMENTS

| | | | |
|---|---|---|---|
| 779,791 | 1/1905 | Lokuciejewsky | 47/1.3 |
| 2,089,872 | 8/1937 | Augier | 363/64 X |
| 2,357,067 | 8/1941 | Alexanderson | 363/64 X |
| 3,178,630 | 4/1965 | Jessee | 363/64 X |
| 3,919,806 | 11/1975 | Pluenneke et al. | 47/1.3 |
| 4,257,190 | 3/1981 | Dykes | 47/1.3 |

*Primary Examiner*—Robert A. Hafer
*Assistant Examiner*—Danton D. DeMille
*Attorney, Agent, or Firm*—Lee H. Kaiser

[57] ABSTRACT

Apparatus for destroying weeds in and around crop rows has a high voltage source of electricity mounted on a vehicle; a coulter wheel for connecting the high voltage source to the ground; a plurality of weed contacting electrodes carried on the vehicle and insulated therefrom; and a plurality of isolating electrical reactance inductors each of which connects a weed contacting electrode to the high voltage source and limits the magnitude of current flowing through the high voltage source when the electrode contacts a weed to thereby minimize the voltage drop across the high voltage source and maintain substantially constant voltage on the remaining electrodes.

7 Claims, 9 Drawing Figures

ELECTRODE ARRANGEMENT FOR ELECTRIC WEED KILLING APPARATUS

This application is a continuation of application Ser. No. 315,137, filed Oct. 26, 1981, now abandoned.

BACKGROUND OF THE INVENTION

This invention relates to electroculture and more particularly to apparatus utilizing electricity for destroying weeds along crop rows.

Weed killing apparatus is known for destroying weeds with electricity such as disclosed in U.S. Pat. No. 3,919,806 wherein a high voltage source of electricity is carried on a vehicle, a coulter wheel grounds the high voltage source, and a conductive elongated horizontal rod mounted on the vehicle and connected to the high voltage source carries a plurality of spaced weed contacting electrodes, such as deflectable conductive spring leaves, adapted to wipe across the plants and transfer electricity thereto. The high voltage source usually comprises an alternating current generator carried on the vehicle and driven by the power take-off drive of the tractor pulling the vehicle and a transformer for stepping up the generator voltage applied to the conductive rod and the weed contacting electrodes.

When a weed contacting electrode wipes across a plant, the high potential of the conductive rod and the electrode causes current to flow through the weed, the earth and the grounding coulter to kill the weed by destroying its cell structure. The high voltage often results in formation of arcs between the electrodes and the plants with flow of relatively high magnitudes of current through the plants to ground. In the open circuit condition when no electrode is in contact with a weed, the high potential $V_g$ at the electrodes is equal to the generator counter EMF voltage CEMF multiplied by the turns ratio $(N_1/N_2)$ of the step-up transformer, or $V_g = $ CEMF times $(N_1/N_2)$. When an electrode contacts a weed, the resulting current flow I may be quite high and result in substantial reduction in voltage on the other electrodes due to flow of the current through the impedance of the high voltage source in accordance with the equation $V_g = [CEMF - Z_E(I \text{ times } N_2/N_1)]$ times $(N_1/N_2)$ where $Z_E$ is the equivalent impendance of the high voltage source. Such voltage reduction is even greater when several electrodes connected to the same conductive rod simultaneously contact weeds so that current is flowing in parallel paths through the weeds to ground, and the reduced voltage level Vg on the remaining electrodes may be insufficient to cause significant destruction of weeds contacted by the spring leaves.

SUMMARY OF THE INVENTION

It is an object of the invention to provide improved electric discharge weed killing apparatus which is more efficient in destroying weeds than known apparatus.

It is a further object of the invention to provide improved electric discharge weed killing apparatus which does not lose its ability to destroy weeds as a result of the voltage drop caused by flow of current through the impedance of the high voltage source.

It is a further object of the invention to provide improved weed killing apparatus having a plurality of weed contacting electrodes wherein the voltage on the non-contacting electrodes remains substantially constant even though current is flowing from an electrode through a weed contacted thereby to ground.

Weed destroying apparatus in accordance with the invention includes a vehicle and a source of high voltage electricity on the vehicle, for example, an electrical generator and a step-up transformer for stepping up the generator voltage. Means such as a coulter wheel on the vehicle connect the high voltage source to ground. A plurality of weed contacting electrodes carried on the vehilce are insulated therefrom and may comprise deflectable conductive spring leaves adapted to wipe across the plants and transfer electricity thereto. Electrical reactance elements, such as isolating inductors or capacitors, in series with individual weed contacting electrodes connect the high voltage source to the electrodes, and the reactance elements limit the current from the high voltage source flowing through an electrode contacting a weed to thereby prevent high voltage drop across the equivalent impedance of the high voltage source and to maintain sufficiently high voltage on the remaining electrodes to destroy weeds contacted by them.

Preferably the high voltage source includes a generator and a step-up transformer, and the impedance of the isolating inductive or capacitive reactance element in series with each electrode is substantially higher than the equivalent impedance of the high voltage source to limit the current flowing through an electrode to a value which will prevent high voltage drop across the generator and step-up transformer. In one embodiment the step-up transformer has a plurality of high leakage inductance secondary windings which comprise the isolating reactance elements through which current flows to the weed contacting electrodes.

BRIEF DESCRIPTION OF THE DRAWINGS

The above and other objects and advantages of the invention will be more readily apparent from consideration of the attached drawing wherein.

DETAILED DESCRIPTION OF THE PREFERRED EMBODIMENT

Figure 1:
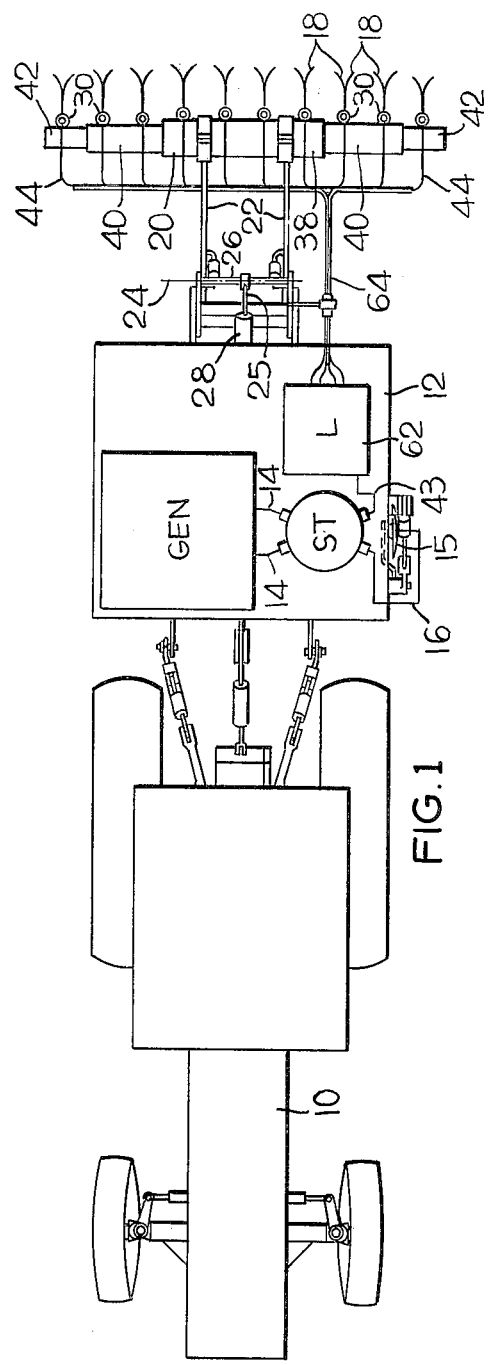
FIG. 1 is a top plan view of weed destroying apparatus embodying the invention and schematically illustrating electrical components thereof.
Figure 2:
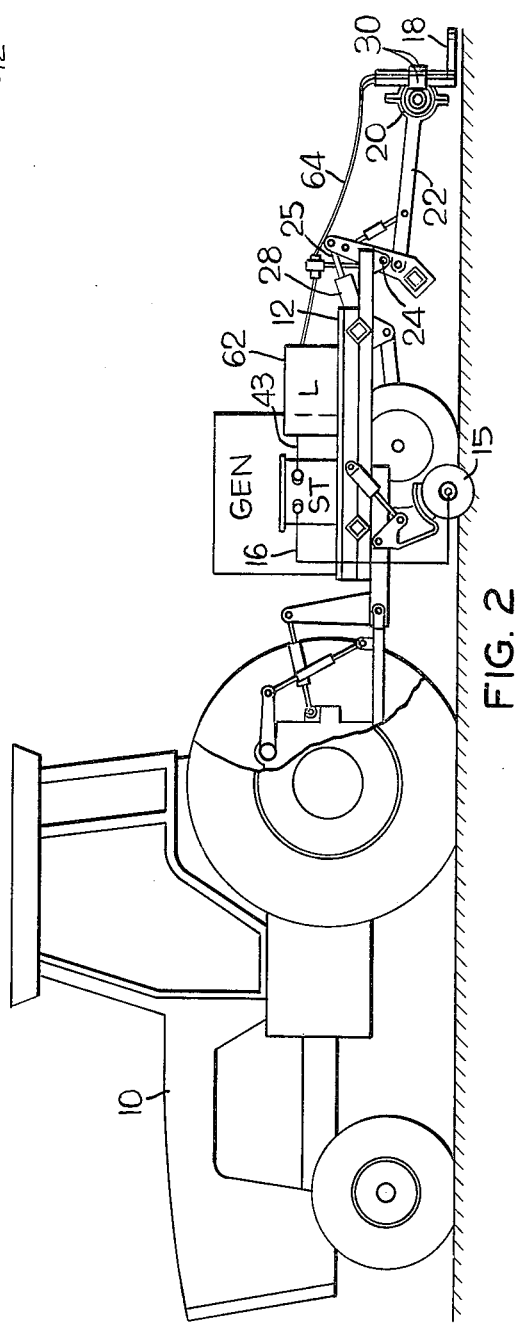
FIG. 2 is a side view of the FIG. 1 apparatus.

FIGS. 1 and 2 illustrate a tractor 10 for pulling a wheeled platform trailer vehicle 12 which carries a high voltage source of electricity including a generator GEN and a step-up transformer ST. Alternatively, the high voltage source can be carried on a platform (not shown) affixed to the frame of tractor 10. Generator GEN may be a sixty hertz AC generator driven by a power take-off drive (not shown) from tractor 10 or from an engine (not shown) mounted on platform trailer 12. A plurality of conductive weed contacting electrodes 18 for engaging and transferring electricity from high voltage source GEN-ST to weeds in and around crop rows may be carried on trailer 12 and insulated therefrom and from each other (or may be carried on a (not-shown) platform affixed on the frame of tractor 10). The output terminals of generator GEN may be connected to the primary winding PRI of step-up transformer ST by insulated conductors 14, and one side of secondary winding SEC (See FIG. 4) of step-up transformer ST may be connected by an insulated conductor 16 to coulter wheel 15 carried on trailer 12 and adapted to penetrate the ground and establish an electrical return path to the high voltage source for current transferred from an electrode 18 to a plant contacted thereby. Weed contacting electrodes 18 are carried on an elongated horizontal support rod 20 extending transverse to the direction of vehicle travel and mounted by arms 22 on platform trailer 12 in insulated relation thereto. Arms 22 may be pivoted to platform trailer 12 about a horizontal axis 24, and a link 25 is attached at one end to a member 26 connecting arms 22 and at its other end to the plunger of a hydraulic cylinder 28 affixed to platform trailer 12 to permit raising and lowering of horizontal rod 20 and electrodes 18 carried thereby.

Figure 3A:
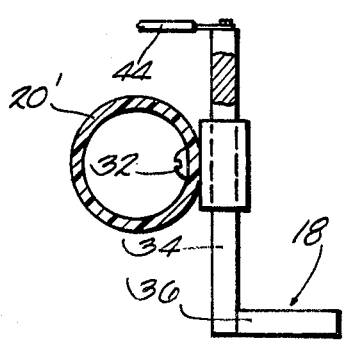
FIG. 3a, 3b and 3c illustrate alternative weed engaging electrode mounting arrangements which electrically insulate the electrodes from each other.
Figure 3B:
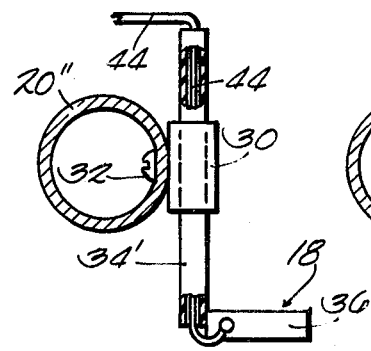
Figure 3C:
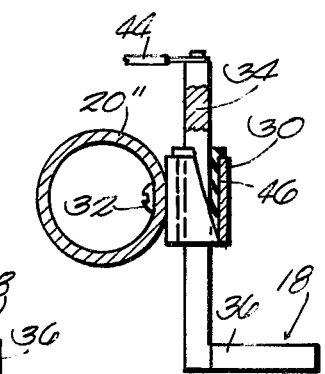

In the embodiments shown in FIGS. 3a, 3b and 3c, electrode mounting collars 30 are attached in longitudinally spaced relation to an elongated horizontal tubular support rod 20 by removable fasteners 32. Slidable within collars 30 are vertically disposed electrode carrying bars 34 having electrodes 18 attached to the lower end thereof which preferably comprise a pair of deflectable conductive spring leaves 36. Leaves 36 are of light material such as a beryllium copper alloy and extend horizontally from bar 34 so that they engage any plant in the path of bar 34 and are deflected by any plant they contact, thereby wiping across the plant and insuring good electrical contact therewith. The bars 34 are preferably vertically slidable within collars 30 to permit location of spring leaves 36 at desired height above ground, e.g., either above the top of the tallest crops so that they do not engage the crops or just above ground level so that all weeds are contacted. Adjustment of electrode carrying bars 34 with respect to collars 30 may be accomplished by suitable means (not shown) such as an interference fit or by a set screw.

Although weed engaging electrodes 18 are theoretically at the same voltage in the open circuit condition when no weeds are contacted thereby, a difference of potential may exist between an electrode 18 contacting a weed and an adjacent electrode 18 which does not, and preferably weed engaging electrodes 18 are insulated from each other. In the embodiment illustrated in FIG. 3a, elongated horizontal tubular support rod 20' is of insulating material to provide the desired insulation and the electrode carrying bars 34 may be of metallic material. In the embodiments illustrated in FIGS. 3b and 3c, elongated tubular support rod 20'' is hollow and of light metallic material such as aluminum and comprises several sliding sections such as a main section 38, middle sections 40, and end sections 42 which may be telescoped together to vary the number of crop rows covered. The sliding sections 38, 40 and 42 may all be at the same voltage, and in the FIG. 3b embodiment electrode carrying bars 34' comprise tubular members of insulating material which provide the desired insulation between weed engaging electrodes 18. The conductive leaves 36 are attached to the lower end of tubular insulating bars 34', and an insulated wire 44 from high voltage source GEN-ST may extend through the axial opening in each tubular electrode carrying bar 34' and be electrically connected to the conductive leaves 36.

Elongated rod 20'', collars 30, and electrode carrying bars 34 are metallic in the embodiment illustrated in FIG. 3c, and tubular insulating sleeves 46 having a shoulder at the upper end are positioned within collars 30 to receive and electrically insulate the conductive electrode carrying bars 34 from each other. In still other embodiments conductive rod 20'' is constructed of short metallic sections with insulating collars (not shown) therebetween.

Figure 4:
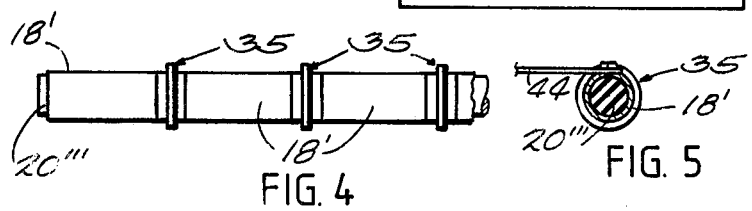
FIGS. 4 and 5 illustrate weed engaging electrodes of alternative configuration.
Figure 5:
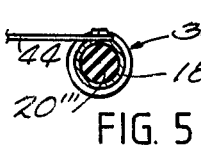

In the embodiment illustrated in FIGS. 4 and 5, the horizontal elongated rod 20''' may be a solid bar of insulating material supporting spaced tubular conductive segments 18' surrounding rod 20''' which comprise the weed engaging electrodes. Insulating wires 44 from high voltage source GEN-ST may be connected to conductive segment electrodes 18', and horizontal rod 20''' supporting electrodes 18' may be carried above the crop and support circular insulating spacers 35 between electrodes 18' to prevent tracking flashovers and to guide the weeds toward the electrodes.

In accordance with the invention, isolating electrical capacitive and inductive reactance elements, preferably inductors 60, are inserted between the high voltage source and the weed engaging electrodes 18. The impedance of each reactance element 60 is preferably substantially higher than the equivalent impedance $Z_E$ of high voltage source GEN-ST. Isolating reactance elements 60 limit the current flowing from high voltage source GEN-ST in a path through an electrode 18 in engagement with a weed, the weed roots and the earth and back through coulter wheel 15 to the high voltage source, thereby preventing high voltage drop across the equivalent impedance of the high voltage source GEN-ST and maintaining sufficiently high voltage on the remaining electrodes 18 to assure destruction of weeds contacted thereby. Isolating reactance elements 60 provide a substantially loss-free voltage drop in comparision to the use of resistors for current limitation. Further, reactance elements 60 also limit current in the event of a fault and thus reduce heating of generator GEN and transformer ST.

Figure 6:
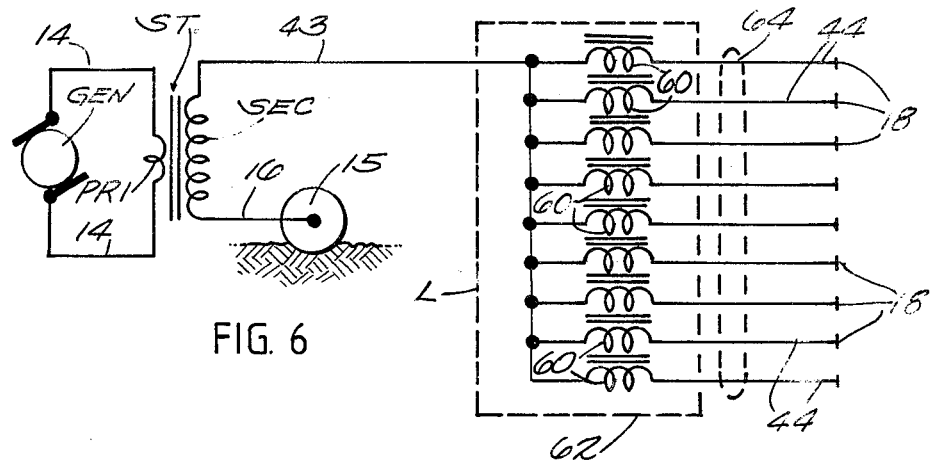
FIG. 6 is a schematic electrical circuit diagram of weed destroying apparatus embodying the invention.

The schematic electrical circuit diagram of FIG. 6 represents that the output terminals of generator GEN are electrically connected by conductors 14 to primary winding PRI of step-up transformer ST. One side of secondary winding SEC of step-up transformer ST is electrically connected by an insulated wire 16 to coulter wheel 15. The other side of secondary winding SEC is connected by an insulated wire 43 to a multi-element inductor L which comprises a plurality of discrete isolating inductor reactance elements 60 disposed within a container 62 (shown in dotted lines in FIG. 6) and preferably encapsulated in insulation (not shown). One side of all inductor elements 60 are commoned and connected through conductor 43 to secondary winding SEC, and the other side of the individual inductor elements 60 are connected by insulated wires 44 forming an electrical cable 64 to the weed engaging electrodes 18.

Figure 7:
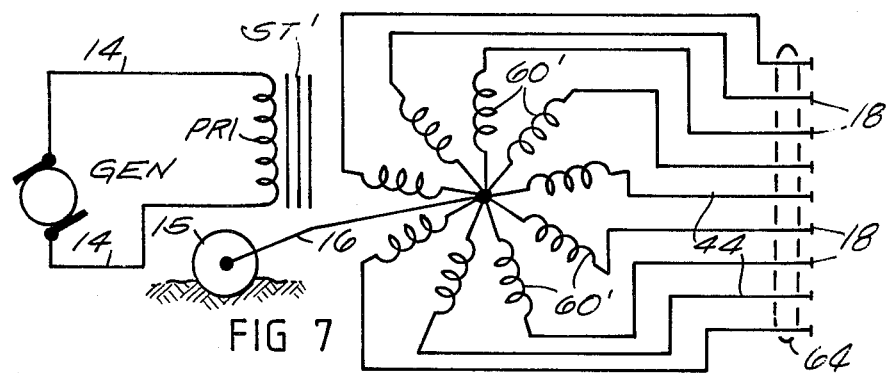
FIG. 7 is a schematic electrical circuit diagram of an alternative embodiment of the invention.

FIG. 7 illustrates an alternative embodiment of the invention wherein the high voltage source includes a generator GEN and a multi-phase step-up transformer ST' having the primary winding PRI thereof coupled by conductors 14 to the output terminals of generator GEN and a plurality of high leakage reactance secondary windings 60' connected in star with the star point, or neutral, coupled by conductor 16 to coulter wheel 15. Weed engaging electrodes 18 are connected through individual insulated conductors 44 of cable 64 to the high leakage inductance secondary windings 60' which comprise isolating inductor reactance elements that limit the current flowing through an electrode 18 contacting a weed and thereby prevent high voltage drop across the equivalent impedance of the high voltage source and also maintain sufficiently high voltage on the remaining electrodes 18 to destroy weeds contacted by them.

The embodiments of the invention in which an exclusive property or privilege is claimed are defined as follows:

1. Apparatus for destroying weeds growing in and around crop rows comprising
   a vehicle,
   a source of high voltage electricity mounted on said vehicle,
   means on said vehicle for connecting said high voltage source to ground,
   a plurality of weed contacting electrodes carried on said vehicle and insulated therefrom, and
   means including a plurality of isolating electrical reactance elements each of which is in series with one of said weed contacting electrodes for connecting said high voltage source to said electrodes so that each said isolating reactance element limits the current flowing through the electrode in series therewith when said electrode contacts a weed and prevents high voltage drop across the equivalent impedance of said high voltage source so the voltage on the outer electrodes remains sufficiently high to destroy weeds contacted by them.

2. Apparatus for destroying weeds in accordance with claim 1 wherein said isolating electrical reactance elements are inductors.

3. Apparatus for destroying weeds in accordance with claim 1 or 2 wherein the impedance of each of said reactance elements is substantially higher than the equivalent impedance of said high voltage source.

4. Apparatus for destroying weeds in accordance with claim 3 wherein said high voltage source includes an electrical generator and a step-up transformer and the inductive reactance each of said inductors is substantially higher than the equivalent impedance of said generator plus said step-up transformer.

5. Apparatus for destroying weeds in accordance with claim 1 or 2 wherein said means for connecting said high voltage source to ground includes a coulter wheel on said vehicle.

6. Apparatus for destroying weeds in accordance with claim 1 or 2, wherein said source of high voltage electricity includes a generator and a multi-phase step-up transformer having a plurality of high leakage reactance secondary windings which comprise said isolating electrical reactance elements in series with said weed contacting electrodes which limit the current flowing through said electrodes in series therewith when they contact weeds and prevent a high voltage drop across the equivalent impedance of said generator plus said transformer so that when one electrode contacts a weed the voltage on the other electrodes remains substantially constant.

7. Apparatus for destroying weeds in accordance with claim 6 wherein said secondary windings are connected in star and the star point is electrically connected to a coulter wheel on said vehicle.

* * * * *

UNITED STATES PATENT OFFICE
CERTIFICATE OF CORRECTION

Patent No. 4,428,150            Dated January 31, 1984

Inventor(s) Allois F. Geiersbach and Thomas P. Gilmore

It is certified that error appears in the above-identified patent and that said Letters Patent are hereby corrected as shown below:

Column 5, line 34, "outer" should read --- other ---.

Signed and Sealed this

Twenty-second Day of May 1984

[SEAL]

Attest:

GERALD J. MOSSINGHOFF

Attesting Officer      Commissioner of Patents and Trademarks